United States Patent [19]

Archung et al.

[11] Patent Number: 4,664,155

[45] Date of Patent: May 12, 1987

[54] APPARATUS FOR CENTRALIZED PRESSURIZATION AND DEPRESSURIZATION OF AIRCRAFT HYDRAULIC RESERVOIRS

[75] Inventors: Ralph Archung, Issaquah; George C. Loetz, Seattle, both of Wash.

[73] Assignee: The Boeing Company, Seattle, Wash.

[21] Appl. No.: 858,860

[22] Filed: Apr. 30, 1986

Related U.S. Application Data

[63] Continuation of Ser. No. 592,565, Mar. 23, 1984, abandoned.

[51] Int. Cl.⁴ ............................................. F16K 11/12
[52] U.S. Cl. ............................... 137/877; 137/883; 137/899.2; 137/208; 60/415; 60/416; 244/78
[58] Field of Search .................. 137/208, 614.19, 861, 137/877, 883, 899.2, 206, 879, 881, 899, 899.4; 91/4 R, 5; 60/416, 415; 244/78; 141/55, 83, 349

[56] References Cited

U.S. PATENT DOCUMENTS

| | | | |
|---|---|---|---|
| 1,367,460 | 2/1921 | Caudron | 137/208 |
| 2,591,641 | 4/1952 | Tiroendle | 60/416 |
| 2,742,052 | 4/1956 | McKee | 251/149.6 X |
| 3,183,931 | 5/1965 | Alford | 137/879 |
| 3,234,964 | 2/1966 | Tinsley et al. | 137/878 X |
| 3,307,570 | 3/1967 | West | 137/861 X |
| 3,368,576 | 2/1968 | Crissey | 137/881 X |
| 3,516,638 | 6/1970 | Piggot | 137/883 X |
| 3,633,618 | 1/1972 | Blackmore et al. | 137/557 X |
| 3,760,842 | 9/1973 | Mihiya | 137/561 R X |
| 3,797,516 | 3/1974 | Forster et al. | 60/416 X |
| 3,880,250 | 4/1975 | Emanuele | 60/415 X |
| 4,090,526 | 5/1978 | Witt et al. | 137/209 |
| 4,168,723 | 9/1979 | Schneider | 137/614.19 X |
| 4,349,046 | 9/1982 | Klem | 137/596 X |

FOREIGN PATENT DOCUMENTS 1202274 8/1970 United Kingdom ................. 60/416

Primary Examiner—A. Michael Chambers
Assistant Examiner—John C. Fox
Attorney, Agent, or Firm—Joan H. Pauly

[57] ABSTRACT

A single manifold assembly is located in an easily accessible hydraulic servicing bay. The assembly includes a manifold (2) with an inlet port (4) having an integral check valve (8). A plurality of branch conduits (18), one for each reservoir, communicate with manifold (2). A two-way shut-off valve (20) is located in each conduit (18). Each valve (20) has a handle (22) for manually moving it between an open and a closed position. Each conduit (18) communicates with its corresponding reservoir. Manifold (2) includes a manual bleed valve (12) and an automatic relief valve (16). By selective positioning of the shut-off valves (20) and operation of bleed valve (12) and inlet port (4), any or all of the reservoirs may be depressurized or pressurized. Preferably, an automatic bleed valve (26) is provided for each individual reservoir. A single gauge (30) mounted on manifold (2) provides pressure readings for any one of the individual reservoirs by selective positioning of valves (20).

16 Claims, 3 Drawing Figures

APPARATUS FOR CENTRALIZED PRESSURIZATION AND DEPRESSURIZATION OF AIRCRAFT HYDRAULIC RESERVOIRS

This application is a continuation of application Ser. No. 592,565, filed Mar. 23, 1984, abandoned

TECHNICAL FIELD

This invention relates to apparatus for pneumatically pressurizing and depressurizing aircraft hydraulic reservoirs and, more particularly, to such apparatus that allows any one or more of a plurality of such reservoirs to be pressurized or depressurized from a single maintenance point on the aircraft.

BACKGROUND ART

Commercial aircraft are normally provided with a plurality of hydraulic system reservoirs. These reservoirs are frequently located in areas of the aircraft that provide only relatively difficult access. For example, three reservoirs might be provided in locations such as the left and right engine aft fairings and one of the wheel wells, respectively. Generally, each reservoir is provided with separate apparatus at its individual location to provide for individual pressurization and depressurization of the reservoir at that location. Therefore, aircraft maintenance personnel are required to pneumatically service each reservoir in its particular location. The difficult access to the locations makes maintenance more difficult and time consuming, thus increasing the cost of maintenance. Such cost is further increased by the additional time required to move equipment and personnel from one location to another.

DISCLOSURE OF THE INVENTION

The subject of this invention is apparatus for pneumatically pressurizing and depressurizing any one or more of a plurality of aircraft hydraulic reservoirs. According to an aspect of the invention, the apparatus comprises a manifold having an inlet port. Bleed valve means is mounted on and communicates with the manifold. A plurality of branch conduits, one corresponding to each reservoir, are connected to and communicate with the manifold. A plurality of shut-off valves is provided, one in each branch conduit. Each shut-off valve has an open position and a closed position and includes handle means for moving the valve into either of such positions. Conduit means communicates each branch conduit with its corresponding reservoir. The manifold, bleed valve means, and branch conduits are dimensioned to be received into a hydraulic servicing bay.

According to another aspect of the invention, the bleed valve means comprises a manually operable bleed valve for depressurizing any of the reservoirs whose corresponding shut-off valves are in their open positions. According to still another aspect of the invention, the bleed valve means further comprises an automatic system bleed valve set to open when pressure in the manifold rises above a first predetermined level and to close when said pressure reduces to a second predetermined level. The system bleed valve is biased to remain closed when said pressure is below the first predetermined level.

A feature of the invention is the provision of an automatic branch bleed valve mounted on each branch conduit and communicating with said branch conduit between the shut-off valve in said branch conduit and the corresponding reservoir. Each branch bleed valve is set to open when pressure in its branch conduit rises above a first predetermined level and to close when said pressure reduces to a second predetermined level. Each branch bleed valve is biased to remain closed when the pressure in its branch conduit is below the first predetermined level. Preferably, the apparatus is provided with restrictor means between each branch bleed valve and the branch conduit with which it communicates. The restrictor means limits the amount of pneumatic fluid exiting the branch conduit through the branch bleed valve. Also preferably, each branch bleed valve is located at substantially the low point of the corresponding branch conduit, conduit means, and reservoir to cause any trapped moisture to be purged therefrom when the branch bleed valve opens. In apparatus having this preferred feature of branch bleed valves located at low points, each branch bleed valve performs two functions, automatically depressurizing the associated reservoir during operation of the aircraft when there is a surge in pneumatic pressure and automatically purging trapped moisture from the reservoir system.

Another preferred feature of the invention is the provision of a check valve integrally formed with the inlet port in the manifold. This check valve allows introduction of pneumatic fluid into the manifold through the port but prevents exiting of fluid through the port. Providing the check valve integrally with the port has the advantages of reducing the number of components of the system and of minimizing the size of the port and check valve to allow the dimensions of the apparatus to remain small enough so that the apparatus may be located in a single hydraulic servicing bay.

Still another preferred feature of the invention is the provision of a gauge mounted on and communicating with the manifold. This arrangement makes it possible to obtain a pressure reading for any one of the individual reservoir systems by selective positioning of the shut-off valves. The arrangement has the additional advantage of reducing the number of components and thereby reducing both cost and size of the apparatus.

From the above, it should be apparent that the provision of apparatus constructed according to the invention solves the maintenance problems discussed above. The apparatus of the invention makes it possible to either pressurize or depressurize any one or more or all of an aircraft's hydraulic system reservoirs at a single maintenance location. The shut-off valves in the branch conduits enable a maintenance person to open or close communication between any one reservoir and the manifold independently of the other reservoirs. Therefore, pneumatic fluid can be introduced into any reservoir or reservoirs as desired simply by positioning the shut-off valves in the appropriate positions and introducing fluid into the manifold through the inlet port. Any one or more or all of the reservoirs may similarly be depressurized by positioning the shut-off valves and operating the bleed valve means. Thus, each of the reservoir systems may be serviced independently without the necessity for maintenance personnel gaining access to individual depressurization apparatus in a difficult access area.

The apparatus of the invention also makes it possible to pressurize any one or more of an aircraft's hydraulic reservoirs that have been depressurized without starting the aircraft engines or auxiliary power units and without applying any source of pressure located on the ground. This can be done as long as there is at least one reservoir that remains pressurized. To pressurize the depressurized reservoirs, the shut-off valves corresponding to the depressurized reservoir or reservoirs and at least one pressurized reservoir are opened so that pressure from the pressurized reservoir will repressurize the reservoirs that have been depressurized. This procedure can be performed quickly and easily by ground maintenance personnel at a single location.

These and other advantages and features will become apparent from the detailed description of the best mode for carrying out the invention that follows.

BRIEF DESCRIPTION OF THE DRAWINGS

In the drawings, like element designations refer to like parts throughout, and.

BEST MODE FOR CARRYING OUT THE INVENTION

Figure 2:
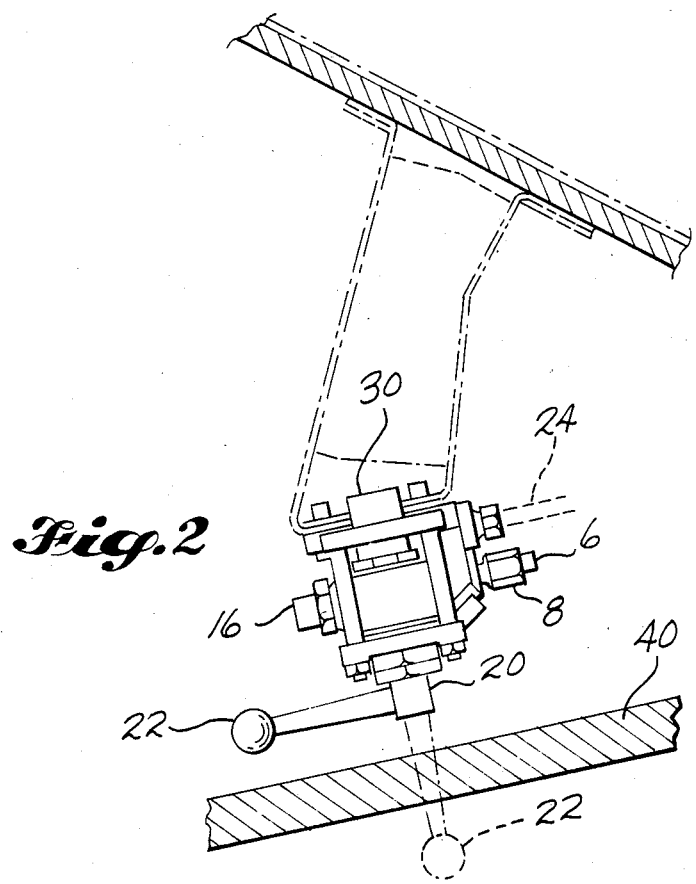
FIG. 2 is an elevational view of the preferred embodiment installed in a hydraulic servicing bay, with the bay door shown in a closed position.
Figure 3:
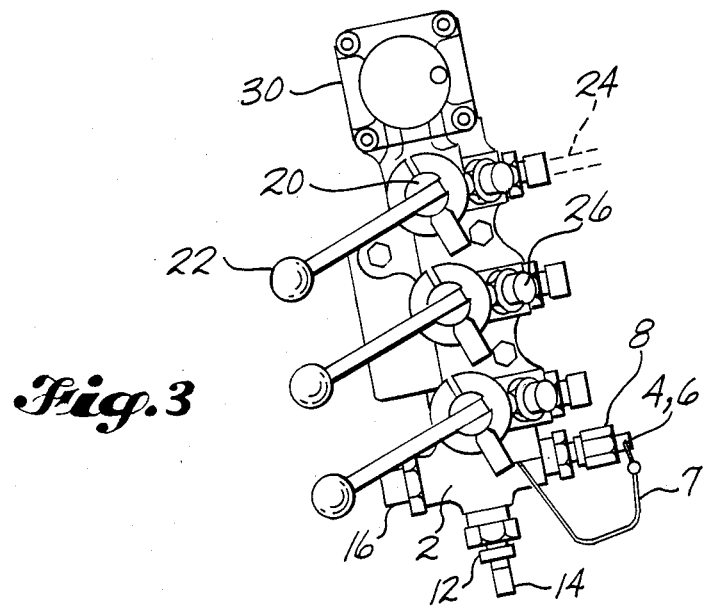
FIG. 3 is a bottom plan view of the apparatus of the invention shown in FIG. 2.

The drawings show apparatus that is constructed according to the invention and that also constitutes the best mode of the invention currently known to the applicant. FIG. 2 illustrates the preferred embodiment of the apparatus installed in a conventional hydraulic servicing bay in an aft wing-to-body fairing area of a medium sized commercial passenger jet aircraft. This particular installation is shown for purposes of illustration and for the purpose of making it clear that the apparatus of the present invention is designed and dimensioned to be received into hydraulic servicing bays of conventional size. It is of course to be understood that the apparatus of the invention may be used advantageously in a wide variety of aircraft and may be installed in a wide variety of locations in a particular aircraft.

As shown in the drawings, the preferred embodiment of the apparatus of the invention includes a manifold 2 to which a plurality of parallel branch conduits 18 are connected. In the embodiment shown in the drawings, there are three branch conduits 18 corresponding to three reservoirs. This particular number of branch conduits was chosen for purposes of illustrating a typical installation of the apparatus of the invention. It is of course to be understood that the number of branch conduits may be varied in aircraft with more or less than three reservoirs that are to be connected to the apparatus without departing from the spirit and scope of the invention.

Referring to the drawings, the manifold 2 is provided with an inlet port 4. The port 4 has external threads at its outer end for receiving a pneumatic coupling. When the port 4 is not in use, a cap 6 is placed over the outer threaded end of the port 4 to protect the threads. The cap 6 is attached to the manifold 2 by a lanyard 7 to prevent its becoming lost or mislaid during servicing of the aircraft.

A check valve 8 is integrally formed with the inlet port 4. This valve 8 allows a pneumatic charge to be introduced into the manifold 2 through the port 4 but prevents pneumatic fluid (pressurized air) from exiting the manifold 2 through the port 4. The valve 8 serves to protect maintenance personnel from exposure to pressurized air and to prevent inadvertent purging of a pneumatic charge in the event that the cap 6 is removed from the port 4 when a shut-off valve is in its open position. The shut-off valves of the apparatus are discussed below.

In the preferred embodiment shown in the drawings, an inlet screeen 10 is provided between the inlet port 4 and the manifold 2. The screen serves to prevent the inadvertent introduction of particulate contaminates into the manifold 2 during servicing of the aircraft. Preferably, the screen 10 is easily and quickly removable so that it may easily and quickly be cleaned and replaced.

The amnifold 2 is provided with bleed valve means mounted on and communicating with the manifold 2. In the preferred embodiment, the bleed valve means includes a manual bleed valve 12 and an automatic system bleed valve 16. As shown in the drawings, the manual bleed valve 12 is located at one end of the manifold 2. The bleed valve 12 is operated by manually pushing the bleed button 14. The button 14 has a passageway extending axially therethrough which communicates with the manifold 2 when the button 14 is pushed inwardly. The automatic system bleed valve 16 serves to protect the system from inadvertent over pressurization during ground servicing.

Figure 1:
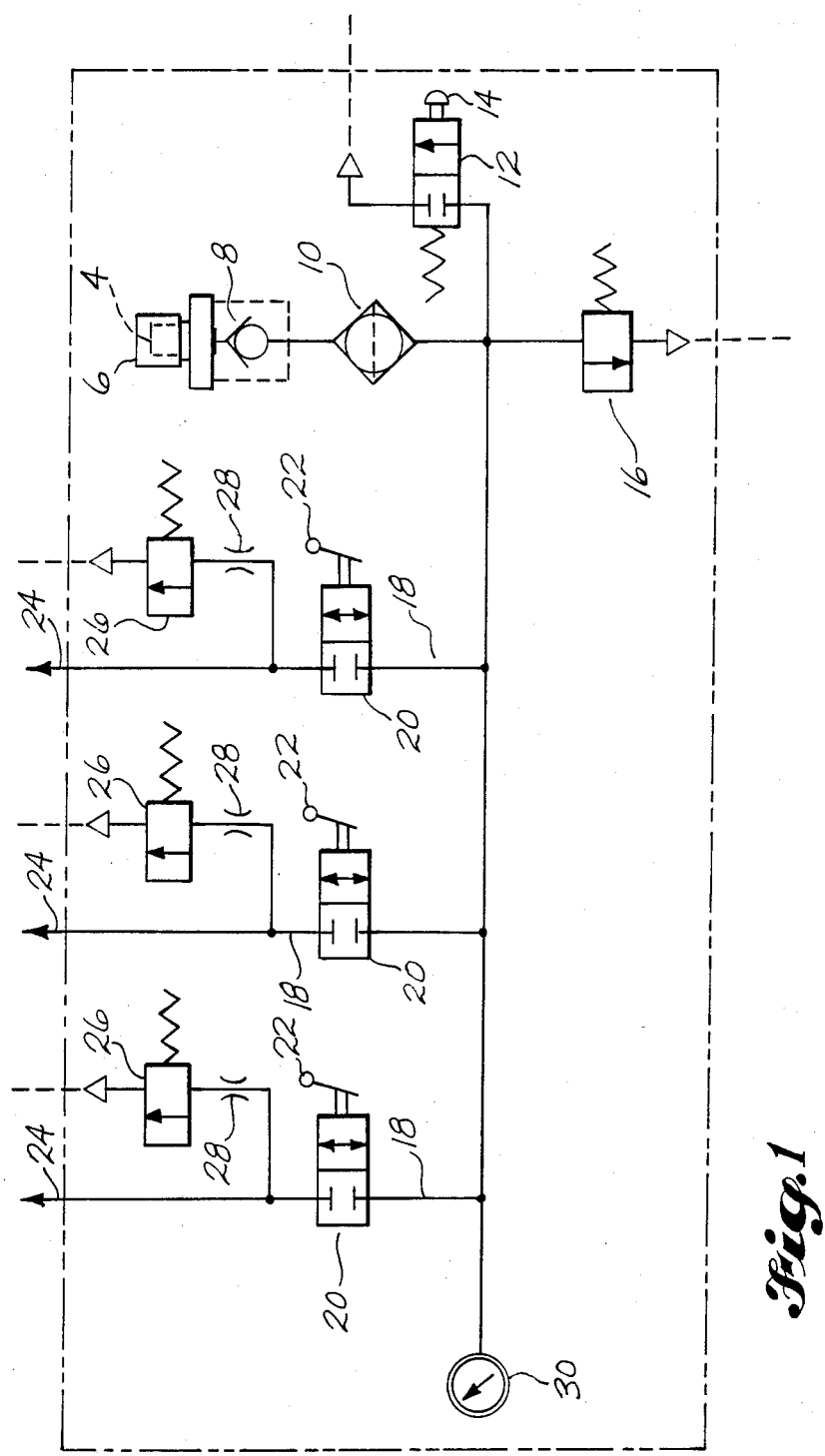
FIG. 1 is a schematic view of the preferred embodiment of the apparatus of the invention.

Each of the three branch conduits 18 shown in the drawings has a two-position shut-off valve 20 located therein. Each shut-off valve 20 has an open position and a closed position. FIG. 1 illustrates each of the shuf-off valves 20 in its closed position. Each shut-off valve 20 has a handle 22 for manual operation of the valve 20. The operation of the valves 20 is illustrated in FIG. 2, in which the closed position of the handle 22 is shown in solid lines and the open position of the handle 22 is shown in broken lines. As can be seen in FIG. 2, the valves 20 are positioned so that, when any one valve handle 22 is in the open position, the ground service bay door 40 is inhibited from being closed. Each valve 20 is provided with detents in the open and closed positions to prevent inadvertent movement from one such position to the other. As a further safeguard, a pin is manually inserted into the valve 20 when maintenance has been completed to secure the valve 20 in the closed position. The pin is attached to the manifold 2 by a lanyard to prevent its loss. Each valve 20 is a two-way valve to permit pressurized air to flow in either direction through the valve 20 when the valve is in its open position.

Each branch conduit 18 communicates with its corresponding reservoir through a conduit 24. Since each valve 20 will allow pneumatic fluid (air) to pass through it in either direction, each reservoir may be serviced independently by selectively positioning the corresponding shut-off valve 20. Each reservoir may be pressurized by opening communication with the inlet port 4 or with another pressurized reservoir via the manifold 2, as discussed in some detail above. Each reservoir may also be independently depressurized by opening its corresponding shut-off valve 20 and operating the manual bleed valve 12. Of course, more than one reservoir may be depressurized at the same time by opening more than one shut-off valve 20 before operating the manual bleed valve 12.

Should a situation arise in which a reservoir is over filled and hydraulic fluid enters the pneumatic lines, a temporary flexible line may be placed over the bleed button 14 on the manual bleed valve 12 before depressing the button 14 to bleed the reservoir system. This causes any hydraulic fluid exiting the bleed valve 12 through the passageway in the bleed button 14 to enter the temporary flexible line without coming into contact with a maintenance person's hands. By this means excess hydraulic fluid may easily be drained into a receptacle without exposing maintenance personnel to the hydraulic fluid. Such exposure is highly undesirable in situations in which the hydraulic fluid is corrosive to the skin, such as when the fluid is a phosphate ester.

In the preferred embodiment, an automatic branch bleed valve 26 is mounted on each branch conduit 18. Each branch bleed valve 26 communicates with its branch conduit 18 between the shut-off valve 20 in the branch conduit 18 and the corresponding reservoir. The valve 26 is set to open when pressure in the branch conduit 18 rises above a predetermined high level and to close when pressure in conduit 18 reduces to a predetermined low level. The valve 26 is biased to remain closed when pressure in conduit 18 is below the predetermined high level. The settings of the valves 26 are chosen to provide automatic bleeding of the pneumatic lines associated with the reservoir when normal engine bleed air surges during engine start, take-off and approach. The settings are designed to cause the valves 26 to reseat and remain closed during the majority of the flight of the aircraft, that is, when the aircraft is cruising. The branch bleed valves 26 provide automatic bleeding of even long pneumatic lines during operation of the aircraft. In the preferred embodiment, the bleed valves 26 are located at substantially the low points of their corresponding branch conduit 18, conduit 24, and reservoir to cause any trapped moisture to be purged therefrom when the bleed valve 26 opens.

The apparatus of the invention is preferably also provided with restrictor means between each branch bleed valve 26 and the branch conduit 18 with which it communicates. This feature serves to limit the amount of pneumatic fluid (pressurized air) exiting the branch conduit 18 through the bleed valve 26. In the preferred embodiment, the restrictor means is provided in the form of a restrictor orifice 28 between the bleed valve 26 and the conduit 18. The orifice 28 is dimensioned to limit the amount of bleed air lost during the normal automatic bleed cycle. Each orifice 28 also serves to limit the amount of loss of engine bleed air when there is a failure in its corresponding automatic branch bleed valve 26. By limiting the loss of engine bleed air, the orifice 28 maintains an adequate reservoir pressure.

The apparatus shown in the drawings also includes a gauge 30 mounted on the manifold 2 on the end of the manifold opposite the manual bleed valve 12. The gauge 30 communicates with the manifold 2. The gauge 30 makes it possible to read the pressure in an individual reservoir system by opening the shut-off valve 20 associated with the particular system and closing the other shut-off valves. Thus, the pressures in each of the reservoir systems may quickly and easily be read from a single location. The gauge 30 is preferably covered with a plexiglass shield to protect the gauge 30 during servicing and to protect maintenance personnel in the event of a gauge failure.

The automatic system bleed valve 16 operates in much the same manner as the automatic branch bleed valves 26. The system bleed valve 16 is set to open when pressure in the manifold 2 rises above a first predetermined level and to close when such pressure reduces to a second predetermined level. The valve 16 is biased to remain closed when pressure in the manifold 2 is below such first predetermined level. In the preferred embodiment shown in the drawings, each of the branch valves 26 is set to open when pressure in the corresponding reservoir pneumatic line rises above 40 pounds per square inch gauge, and the system relief valve 16 is set to open when pressure in the manifold 2 rises above 95 pounds per square inch gauge. The difference in size between the branch bleed valves 26 and the system relief valve 16 prevents inadvertent interchangeability between valves 26 and valve 16.

The apparatus of the invention allows any one or more or all of a plurality of aircraft hydraulic reservoirs to be either pressurized for normal system operation or depressurized for ground service from one single maintenance location on the aircraft. In order to make this possible and to allow the apparatus to be installed in conventional hydraulic servicing bays, all of the components of the apparatus (except for the conduits 24 which extend out of the servicing bay to the reservoir locations) are contained in a single manifold assembly. In addition, the components are dimensioned to permit the manifold assembly to be received into the servicing bay. (For example, the preferred embodiment shown in the drawings is about nine inches by four inches by four inches.) Thus, apparatus which may be easily and quickly operated to pressurize and/or depressurize a plurality of reservoirs is positioned in a single maintenance location that is easily accessible by maintenance personnel.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. Apparatus for individually pneumatically pressurizing and depressurizing any one of a plurality of aircraft hydraulic reservoirs from a single maintenance location and for simultaneously pneumatically pressurizing and depressurizing more than one of the reservoirs from said location, comprising:

a manifold having an inlet port;
bleed valve means mounted on and communicating with the manifold;
a plurality of branch conduits, one corresponding to each reservoir; said branch conduits being connected to and in simultaneous communication with the manifold;
a plurality of manual shut-off valves, one in each branch conduit; each said shut-off valve having an open position and a closed position; and said shut-off valves including handle means for moving each said valve into either of said positions, to open communication between the manifold and any one of the reservoirs to permit said pressurizing and depressurizing of said one of the reservoirs individually, and to open communication between the manifold and more than one of the reservoirs simultaneously to permit said pressurizing and depressurizing of said more than one of the reservoirs simultaneously and to permit pressurizing of one of the reservoirs by supplying pressure solely from another of the reservoirs; and
conduit means communicating each branch conduit with its corresponding reservoir;

wherein the manifold, bleed valve means, and branch conduits are dimensioned to be received into and mounted within a single hydraulic servicing bay to permit said pressurizing and depressurizing to be carried out from said bay.

2. Apparatus as described in claim 1, in which the bleed valve means comprises a manually operable bleed valve for individually depressurizing any one of the reservoirs whose corresponding shut-off valve is in its open position when the other shut-off valves are in their closed positions, and for simultaneously depressurizing more than one of the reservoirs whose corresponding shut-off valves are simultaneously in their open positions.

3. Apparatus as described in claim 2, in which the bleed valve means further comprises an automatic system bleed valve set to open, to relieve pressure in the manifold, when pressure in the manifold rises above a first predetermined level and to close when said pressure reduces to a second predetermined level, and biased to remain closed when said pressure is below said first predetermined level.

4. Apparatus as described in claim 1, further comprising an automatic branch bleed valve communicating with each said conduit means between the shut-off valve in the corresponding branch conduit and the corresponding reservoir; said branch bleed valve being set to open when, during operation of an aircraft in which the apparatus is installed, a pressure surge causes pressure in said conduit means to rise above a first predetermined level and to close when said pressure reduces to a second predetermined level, and biased to remain closed when said pressure is below said first predetermined level.

5. Apparatus for individually pneumatically pressurizing and depressurizing any one of a plurality of aircraft hydraulic reservoirs from a single maintenance location and for simultaneously pneumatically pressurizing and depressurizing more than one of the reservoirs from said location, comprising:
   a manifold having an inlet port;
   bleed valve means mounted on and communicating with the manifold;
   a plurality of branch conduits, one corresponding to each reservoir; said branch conduits being connected to and in simultaneous communication with the manifold;
   a plurality of manual shut-off valves, one in each branch conduit; each said shut-off valve having an open position and a closed position, and including handle means for moving said valve into either of said positions;
   conduit means communicating each branch conduit with its corresponding reservoir; and
   an automatic branch bleed valve mounted on each branch conduit and communicating with said branch conduit between the shut-off valve in said branch conduit and the corresponding reservoir; said branch bleed valve being set to open when, during operation of an aircraft in which the apparatus is installed, a pressure surge causes pressure in said branch conduit to rise above a first predetermined level and to close when said pressure reduces to a second predetermined level, and biased to remain closed when said pressure is below said first predetermined level;
   wherein the manifold, bleed valve means, and branch conduits are dimensioned to be received into and mounted within a single hydraulic servicing bay to permit said pressurizing and depressurizing to be carried out from said bay; and
   wherein said shut-off valves and their handle means are operable to open communication between the manifold and any one of the reservoirs, to permit said pressurizing and depressurizing of said one of the reservoirs individually; and to open communication between the manifold and more than one of the reservoirs simultaneously, to permit said pressurizing and depressurizing of said more than one of the reservoirs simultaneously, and to permit pressurizing of one of the reservoirs by supplying pressure solely from another of the reservoirs.

6. Apparatus as described in claim 5, in which each each branch conduit and its corresponding branch bleed valve are positioned to locate said branch bleed valve substantially at a low point of the corresponding branch conduit, conduit means, and reservoir to cause trapped moisture to be purged therefrom when said branch bleed valve opens.

7. Apparatus as described in claim 5, further comprising restrictor means between each branch bleed valve and the branch conduit with which it communicates, to limit the amount of pneumatic fluid exiting said branch conduit through said branch bleed valve during normal operation and when there is a failure in said branch bleed valve.

8. Apparatus for individually pneumatically pressurizing and depressurizing any one of a plurality of aircraft hydraulic reservoirs and for simultaneously pneumatically pressurizing and depressurizing more than one of the reservoirs, comprising:
   a manifold having an inlet port;
   a plurality of branch conduits, one corresponding to each reservoir; said branch conduits being connected to and in simultaneous communication with the manifold;
   a plurality of shut-off valves, one in each branch conduit; each said shut-off valve having an open position and a closed position, and including handle means for moving said valve into either of said positions;
   conduit means communicating each branch conduit with its corresponding reservoir;
   bleed valve means mounted on and communicating with the manifold; said bleed valve means comprising a manually operable bleed valve for individually depressurizing any one of the reservoirs whose corresponding shut-off valve is in its open position when the other shut-off valves are in their closed positions, and for simultaneously depressurizing more than one of the reservoirs whose corresponding shut-off valves are simultaneously in their open positions; and said bleed valve means further comprising an automatic system bleed valve set to open when pressure in the manifold rises above a first predetermined level and to close when said pressure reduces to a second predetermined level, and biased to remain closed when said pressure is below said first predetermined level;
   an automatic branch bleed valve mounted on each branch conduit and communicating with said branch conduit between the shut-off valve in said branch conduit and the corresponding reservoir; said branch bleed valve being set to open when, during operation of an aircraft in which the apparatus is installed, a pressure surge causes pressure in said branch conduit to rise above a third predetermined level and to close when said pressure reduces to a fourth predetermined level, and biased to remain closed when said pressure is below said third predetermined level; and each branch conduit and its corresponding branch bleed valve being positioned to locate said branch bleed valve substantially at a low point of the corresponding branch conduit, conduit means, and reservoir to cause trapped moisture to be purged therefrom when said branch bleed valve opens;

restrictor means between each branch bleed valve and the branch conduit with which it communicates, to limit the amount of pneumatic fluid exiting said branch conduit through said branch bleed valve;

a check valve integrally formed with said inlet port, to allow introduction of pneumatic fluid into the manifold through said port but prevent exiting of fluid through said port; and a gauge mounted on and communicating with the manifold;

wherein the manifold, bleed valve means, and branch conduits are dimensioned to be received into a hydraulic servicing bay; and wherein said shut-off valves and their handle means are operable to open communication between the manifold and any one of the reservoirs, to permit said pressurizing and depressurizing of said one of the reservoirs individually; and to open communication between the manifold and more than one of the reservoirs simultaneously, to permit said pressurizing and depressurizing of said more than one of the reservoirs simultaneously, and to permit pressurizing of one of the reservoirs by supplying pressure solely from another of the reservoirs.

9. In combination with an aircraft having a plurality of hydraulic reservoirs and a hydraulic servicing bay with a ground service bay door, apparatus for individually pneumatically pressurizing and depressurizing any one of said reservoirs and for simultaneously pneumatically pressurizing and depressurizing more than one of said reservoirs, said apparatus comprising:

a manifold having an inlet port;

bleed valve means mounted on and communicating with the manifold;

a plurality of branch conduits, one corresponding to each reservoir; said branch conduits being connected to and in simultaneous communication with the manifold;

a plurality of manual shut-off valves, one in each branch conduit; each said shut-off valve having an open position and a closed position; and said shut-off valves including handle means for moving each said valve into either of said positions, to open communication between the manifold and any one of the reservoirs to permit said pressurizing and depressurizing of said one of the reservoirs individually, and to open communication between the manifold and more than one of the reservoirs simultaneously to permit said pressurizing and depressurizing of said more than one of the reservoirs simultaneously and to permit pressurizing of one of the reservoirs by supplying pressure solely from another of the reservoirs; and conduit means communicating each branch conduit with its corresponding reservoir;

wherein the manifold, bleed valve means, and branch conduits are dimensioned to be received into and are mounted in the hydraulic servicing bay, and the inlet port and each of the handle means are positioned to be accessible to maintenance personnel through the ground service bay door.

10. Apparatus as described in claim 9, in which the bleed valve means comprises a manually operable bleed valve for individually depressurizing any one of the reservoirs whose corresponding shut-off valve is in its open position when the other shut-off valves are in their closed positions, and for simultaneously depressurizing more than one of the reservoirs whose corresponding shut-off valves are simultaneously in their open positions.

11. In combination with an aircraft having a plurality of hydraulic reservoirs and a hydraulic servicing bay with a ground service bay door, apparatus for individually pneumatically pressurizing and depressurizing any one of said reservoirs and for simultaneously pneumatically pressurizing and depressurizing more than one of said reservoirs, said apparatus comprising:

a manifold having an inlet port;

bleed valve means mounted on and communicating with the manifold;

a plurality of branch conduits, one corresponding to each reservoir; said branch conduits being connected to and in simultaneous communication with the manifold;

a plurality of manual shut-off valves, one in each branch conduit; each said shut-off valve having an open position and a closed position, and including handle means for moving said valve into either of said positions; and each said handle means being positioned to inhibit the ground service bay door from being closed when the corresponding shut-off valve is in its open position; and conduit means communicating each branch conduit with its corresponding reservoir;

wherein the manifold, bleed valve means, and branch conduits are dimensioned to be received into and are mounted in the hydraulic servicing bay, and the inlet port and each of the handle means are positioned to be accessible to maintenance personnel through the ground service bay door; and wherein said shut-off valves and their handle means are operable to open communication between the manifold and any one of the reservoirs, to permit said pressurizing and depressurizing of said one of the reservoirs individually; and to open communication between the manifold and more than one of the reservoirs simultaneously, to permit said pressurizing and depressurizing of said more than one of the reservoirs simultaneously, and to permit pressurizing of one of the reservoirs by supplying pressure solely from another of the reservoirs.

12. For use in an aircraft of the type having a plurality of hydraulic reservoirs and a hydraulic servicing bay with a ground service bay door, apparatus for individually pneumatically pressurizing and depressurizing any one of said reservoirs and for simultaneously pneumatically pressurizing and depressurizing more than one of said reservoirs, said apparatus comprising:

a manifold having an inlet port;

bleed valve means mounted on and communicating with the manifold;

a plurality of branch conduit, one corresponding to each reservoir; said branch conduits being connected to and in simultaneous communication with the manifold;

a plurality of manual shut-off valves, one in each branch conduit; each said shut-off valve having an open position and a closed position; and said shut-off valves including handle means for moving each said valve into either of said positions, to open communication between the manifold and any one of the reservoirs to permit said pressurizing and depressurizing of said one of the reservoirs individually, and to open communication between the manifold and more than one of the reservoirs simultaneously to permit said pressurizing and depressurizing of said more than one of the reservoirs simultaneously and to permit pressurizing of one of the reservoirs by supplying pressure solely from another of the reservoirs; and conduit means communicating each branch conduit with its corresponding reservoir;

wherein the manifold, bleed valve means, and branch conduits are dimensioned to be received into and mounted within the hydraulic servicing bay, and the inlet port and each of the handle means are positioned to be accessible to maintenance personnel through the ground service bay door when the manifold, bleed valve means, and branch conduits are so mounted.

13. Apparatus as described in claim 12, in which the bleed valve means comprises a manually operable bleed valve for individually depressurizing any one of the reservoirs whose corresponding shut-off valve is in its open position when the other shut-off valves are in their closed positions, and for simultaneously depressurizing more than one of the reservoirs whose corresponding shut-off valves are simultaneously in their open positions.

14. For use in an aircraft of the type having a plurality of hydraulic reservoirs and a hydraulic servicing bay with a ground service bay door, apparatus for individually pneumatically pressurizing and depressurizing any one of said reservoirs and for simultaneously pneumatically pressurizing and depressurizing more than one of said reservoirs, said apparatus comprising:

a manifold having an inlet port;

bleed valve means mounted on and communicating with the manifold;

a plurality of branch conduits, one corresponding to each reservoir; said branch conduits being connected to and in simultaneous communication with the manifold;

a plurality of manual shut-off valves, one in each branch conduit; each said shut-off valve having an open position and a closed position, and including handle means for moving said valve into either of said positions; each said handle means being positioned to inhibit the ground service bay door from being closed when the corresponding shut-off valve is in its open position; and conduit means communicating each branch conduit with its corresponding reservoir;

wherein the manifold, bleed valve means, and branch conduits are dimensioned to be received into and mounted within the hydraulic servicing bay, and the inlet port and each of the handle means are positioned to be accessible to maintenance personnel through the ground service bay door when the manifold, bleed valve means, and branch conduits are so mounted; and wherein said shut-off valves and their handle means are operable to open communication between the manifold and any one of the reservoirs, to permit said pressurizing and depressurizing of said one of the reservoirs individually; and to open communication between the manifold and more than one of the reservoirs simultaneously, to permit said pressurizing and depressurizing of said more than one of the reservoirs simultaneously, and to permit pressurizing of one of the reservoirs by supplying pressure solely from another of the reservoirs.

15. Apparatus for individually pneumatically pressurizing and depressurizing any one of a plurality of aircraft hydraulic reservoirs from a single maintenance location and for simultaneously pneumatically pressurizing and depressurizing more than one of the reservoirs from said location, comprising:

a manifold having an inlet port;

a plurality of branch conduits, one corresponding to each reservoir; said branch conduits being connected to and in simultaneous communication with the manifold;

a plurality of manual shut-off valves, one in each branch conduit; each said shut-off valve having an open position and a closed position, and including handle means for moving said valve into either of said positions;

conduit means communicating each branch conduit with its corresponding reservoir;

bleed valve means mounted on and communicating with the manifold; said bleed valve means comprising a manually operable bleed valve for individually depressurizing any one of the reservoirs whose corresponding shut-off valve is in its open position when the other shut-off valves are in their closed positions, and for simultaneously depressurizing more than one of the reservoirs whose corresponding shut-off valves are simultanously in their open positions; and said bleed valve means further comprising an automatic system bleed valve set to open, to relieve pressure in the manifold, when pressure in the manifold rises above a first predetermined level and to close when said pressure reduces to a second predetermined level, and biased to remain closed when said pressure is below said first predetermined level;

an automatic branch bleed valve mounted on each branch conduit and communicating with said branch conduit between the shut-off valve in said branch conduit and the corresponding reservoir; said branch bleed valve being set to open when, during operation of an aircraft in which the apparatus is installed, a pressure surge causes pressure in said branch conduit to rise above a third predetermined level and to close when said pressure reduces to a fourth predetermined level, and biased to remain closed when said pressure is below said third predetermined level; and each branch conduit and its corresponding branch bleed valve being positioned to locate said branch bleed valve at a low point of the corresponding branch conduit, conduit means, and reservoir to cause trapped moisture to be purged therefrom when said branch bleed valve opens;

restrictor means between each branch bleed valve and the branch conduit with which it communicates, to limit the amount of pneumatic fluid exiting said branch conduit through said branch bleed valve during normal operation and when there is a failure in said branch bleed valve;

a check valve integrally formed with said inlet port, to allow introduction of pneumatic fluid into the manifold through said port but prevent exiting of fluid through said port; and a gauge mounted on and communicating with the manifold;

wherein the manifold, bleed valve means, and branch conduits are dimensioned to be received into and mounted within a single hydraulic servicing bay to permit said pressurizing and depressurizing to be carried out from said bay; and wherein said shut-off valves and their handle means are operable to open communication between the manifold and any one of the reservoirs, to permit said pressurizing and depressurizing of said one of the reservoirs individually; and to open communication between the manifold and more than one of the reservoirs simultaneously, to permit said pressurizing and depressurizing of said more than one of the reservoirs simultaneously, and to permit pressurizing of one of the reservoirs by supplying pressure solely from another of the reservoirs.

16. Apparatus as described in claim 15, in which said single maintenance location is a hydraulic servicing bay with a ground service bay door; and each handle means is positioned to inhibit the ground service bay door from being closed when the corresponding shut-off valve is in its open position.

* * * * *